June 12, 1951 J. S. VOIGT 2,556,860
INTERMEDIATE SPEED GEAR SYNCHRONIZER
Filed June 16, 1945

INVENTOR
JOHNSTON STUART VOIGT
BY Carl J. Barbee
HIS ATTORNEY

Patented June 12, 1951

2,556,860

UNITED STATES PATENT OFFICE 2,556,860

INTERMEDIATE SPEED GEAR SYNCHRONIZER

Johnston Stuart Voigt, Kenosha, Wis., assignor to Nash-Kelvinator Corporation, Kenosha, Wis., a corporation of Maryland Application June 16, 1945, Serial No. 599,928

7 Claims. (Cl. 192—53)

1

This invention relates to improvements in transmission gearing and more particularly to intermediate speed clutch devices used in power transmissions although the invention is not necessarily limited to such use. More specifically, my invention is advantageous in its application as a dual synchronizing device of a power transmission wherein an intermediate speed gear is synchronized directly with the main shaft as well as indirectly through the usual jaw clutch synchronizer mounted on the main shaft.

It is an object of this invention to provide a dual synchronizer device for an intermediate speed gear of a power transmission wherein said gear will be synchronized with the main shaft on both its forward and rearward sides.

It is a further object of this invention to provide a dual synchronizer for an intermediate speed gear of a power transmission which will be economical to manufacture, simple in its use and which will require very little revision of the parts of an ordinary automotive transmission.

Figure 1:
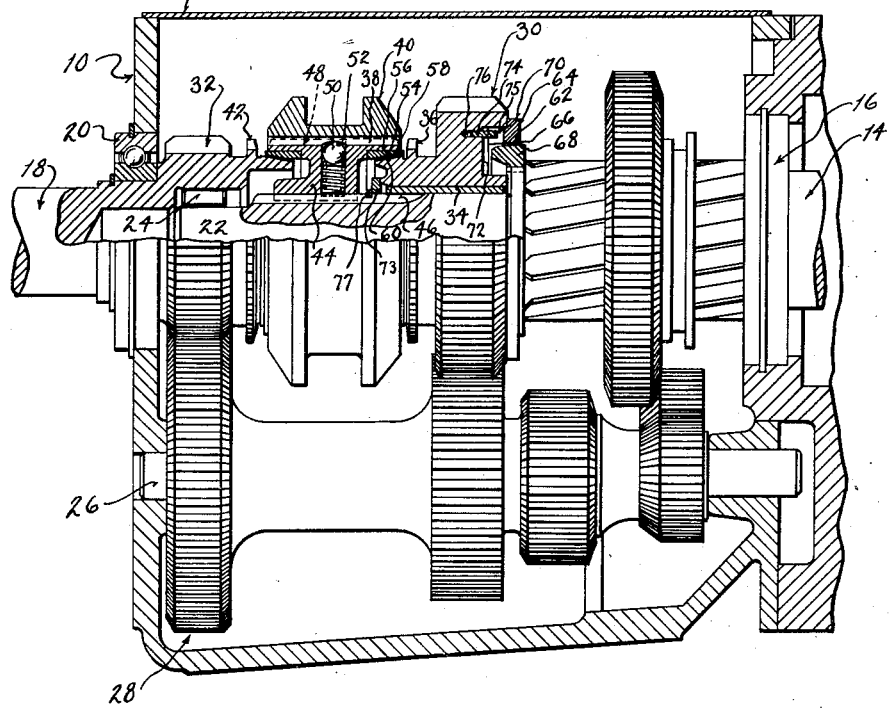
Figure 2:
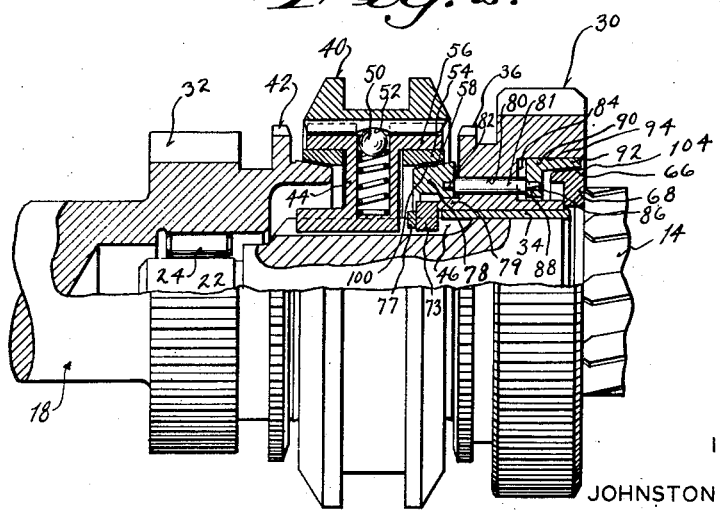

Further objects and advantages of this invention will be apparent from a consideration of the following description and the attached drawings, of which there is one sheet, and in which:

Figure 1 is a side elevation, partially in section, of an automotive transmission, showing the invention in its neutral or starting position; and Figure 2 is a partial side elevation, partially in section, of an automotive transmission, showing another form of the invention shown in Figure 1.

In Figure 1 is shown a transmission case 10 provided with a cover 12. The transmission within case 10 comprises a main shaft 14 journaled in a bearing 16 which is mounted in the rear wall of case 10. The clutch shaft 18 is journaled within the ball bearing 20 which is secured in the front wall of case 10. The forward end 22 of main shaft 14 is journaled within roller bearings 24 which are positioned within a hole formed in the rearward end of clutch shaft 18.

A countershaft 26 is secured in the walls of case 10 and rotatively supported upon said countershaft is the usual countershaft gear cluster indicated generally at 28, the gears of which are in constant mesh with gear 30, rotatively supported upon the main shaft 14, and with gear 32 which is formed on the clutch shaft 18. Gear 30 is rotatively carried upon main shaft 14 by a sleeve 34 of bearing material. Formed on gear 30 is intermediate clutch gear 36 designed to be engaged by the teeth 38 of internally toothed clutch collar 40. Formed on clutch shaft 18 is clutch gear 42 designed, as is gear 36, to be en-

2 gaged by the teeth 38 of internally toothed collar 40.

The transmission within case 10 is provided with an ordinary jaw clutch synchronizer comprised of an internally splined hub 44 slidably secured on splined portion 46 of main shaft 14. Around its outer periphery, hub 44 is defined by gear teeth 48 which are in constant engagement with internal gear teeth 38 of collar 40. Collar 40 is designed to be manually moved forwardly and rearwardly of the hub 44.

Hub 44 is provided with spring pressed balls 50 which engage recesses 52 formed in those gear teeth 38 opposite said balls 50. In this manner the initial movement of collar 40 on hub 44 is restrained so that for a short distance hub 44 will be moved with collar 40. In this manner the friction cone 54 which is secured to the underside of longitudinally extending portion 56 of hub 44 will have its inner flat angular face 58 moved into engagement with the flat angular face 60 formed on the forward side of second speed gear 30, thereby tending to synchronize the speed of said gear 30 and hub 44 and thereby tending to synchronize shafts 14 and 18.

When surface 58 is pushed into engagement with surface 60, second speed gear 30 will be moved rearwardly along main shaft 14, which will cause the flat surface 62 of friction cone 64 to engage the outside surface 66 of ring 68 which is rigidly secured to main shaft 14.

Friction cone 64 is positioned between second speed gear 30 and ring 68 and has a radially extending portion 70 abutting the side of said gear 30 and a forwardly extending portion extending into a cutout portion 72 in the rearward side of gear 30. A series of pins 74 are positioned within blind holes 76 tapped in gear 30 within cutout portion 72 and extend therefrom into a series of notches 75 cut in the forward portion of friction cone 64, thereby causing cone 64 to be driven by gear 30. In this manner cone 64 is connected to gear 30, forming a semi-rigid driving connection which permits limited independent movement of cone 64 and full engagement of cone 64 with ring 68 irrespective of misalignment thereof when said cone is moved into engagement with ring 68 to facilitate maximum frictional engagement between friction surface 62 and friction surface 66. Gear 30 is limited in forward movement along shaft 14 by a pair of snap rings 73 and 77 positioned around portion 46 of shaft 14. Ring 77 is positioned in grooves cut in portion 46.

The invention as described above provides a dual synchronizing arrangement wherein manual movement of the clutch collar 40 by the operator in a rearward direction will result in hub 44 being moved in a like direction, pushing cone 54 into engagement with surface 60 of gear 30. Further movement of collar 40 and hub 44 in a rearward direction will cause gear 30 to be moved in a rearward direction, thereby moving surface 62 of friction cone 64 into friction engagement with surface 66 of ring 68 which is rigidly secured on main shaft 14. In this way, the speed of rotation of gear 30 determined by the speed of rotation of clutch shaft 18 will be synchronized to the approximate speed of rotation of main shaft 14 through the frictional engagement of the members mounted thereon with the second speed gear 30.

In Figure 2 there is illustrated a modification of the invention as shown in Figure 1 wherein like parts will be indicated by like numerals. In the invention as shown in Figure 2, clutch collar 40 may be moved in a rearward direction and, as described in regard to the invention of Figure 1, hub 44 will be moved rearwardly on the splined portion 46 of main shaft 14 until the surface 58 of friction cone 54 engages the outside angular surface 100 of ring 78 which surrounds the forwardly presented flange 79 formed on gear 30. Ring 78 is rearwardly movable on flange 79 and is moved in said direction by rearward movement of hub 44 after cone 54 has engaged the outer surface of ring 78.

Through a series of apertures 80 extending through the web of gear 30 extends a series of connecting pins 81 having reduced portions 82 positioned within a series of blind holes in the rearward side of ring 78. Pins 81 extend rearwardly from apertures 80 into a groove 84 formed in the rearward side of gear 30 and have reduced portions 86 positioned within a series of apertures 88 extending through the body portion of friction cone 90.

Friction cone 90 has an axially extending portion 92 positioned between the outer axially extending wall 94 of groove 84 and the outer angular face 66 of ring 68 which is rigidly secured to the main shaft 14. The outer surface of friction cone 90 is in frictional engagement with the wall 94 of groove 84.

As hub 44 is manually moved rearwardly, cone 54 engages the outer surface 100 of ring 78, thereby creating a frictional engagement between said ring and the main shaft 14 through said hub 44. As these means are moved further rearwardly, ring 78 will be moved rearwardly along flange 79, pushing pins 81 rearwardly and thereby moving friction cone 90 in a like direction until its inner angular friction surface 104 frictionally engages the outer surface 66 of ring 68, thereby creating a frictional engagement between main shaft 14 and gear 30. In this manner the second speed gear 30 drives a frictional engagement member on each of its forward and rearward sides which engage friction members driven and carried by the main shaft 14 on either side of gear 30, thereby providing a dual synchronizer for said second speed gear 30.

While I have described my invention in some detail, I intend this description to be an example only and not a limitation upon my invention, to which I make the following claims:

1. A synchronizing means for an intermediate speed gear of a power transmission comprising a first torque transmitting member, an axially movable intermediate speed gear drivingly associated with said member, a first jaw clutch element formed on said gear, a second torque transmitting member, an axially movable second jaw clutch element drivingly associated with said second member and adapted to positively engage said first element, a first friction clutch element adapted to engage said jaw clutch elements prior to positive engagement thereof for synchronizing the same, and a second friction clutch element associated with the first friction clutch element and adapted to engage said second torque transmitting element for synchronizing said gear and said second member prior to positive engagement of said first and second jaw clutch elements.

2. Synchronizing means for a speed gear of a power transmission comprising a first torque transmitting member, a second torque transmitting member, a gear rotatably mounted on said second member and drivingly associated with said first member, a first jaw clutch element formed on said gear, a second jaw clutch element drivingly associated with said second member and axially movable thereon and adapted for positive engagement with said first jaw clutch element, a first friction clutch means secured to said second jaw clutch element and adapted to engage said first jaw clutch element when said second element is moved toward engagement with said first element, and a second friction clutch means semi-rigidly connected to and drivingly associated with the first friction clutch means and adapted to engage said second torque transmitting member for synchronizing said gear and said member.

3. Synchronizing means for a power transmission comprising a first torque transmitting member, a second torque transmitting member, a gear telescopically mounted on said second member and drivingly associated with said first member, a first jaw clutch element formed on said gear, a second jaw clutch element drivingly associated with said second member and adapted to be moved axially for positive engagement with said first jaw clutch element, a first friction clutch means drivingly associated with said gear and axially movable independently thereof, a second friction clutch means associated with said second jaw clutch element and adapted to engage said first friction clutch means when said second jaw clutch element is moved to engage said first jaw clutch element, a third friction clutch means drivingly associated with said gear on its side opposite said first friction clutch means adapted to engage said second torque transmitting member when said second jaw clutch element is moved toward positive engagement with said first jaw clutch element, and a plurality of axially movable connection means extending through said gear between the first friction clutch means and the third friction clutch means for axially moving and driving the same.

4. Synchronizer means for a power transmission comprising a first torque transmitting member, a second torque transmitting member, a gear telescopically mounted on said second member and drivingly associated with said first member, a first jaw clutch element formed on one side of said gear, an axially movable second jaw clutch element secured on said second member and adapted to be moved into positive engagement with said first jaw clutch element, a first friction clutch element drivingly associated with said gear and axially movable independently thereof, a second friction clutch element associated with said second jaw clutch element and adapted to engage said first friction clutch element when said second jaw clutch element is moved to engage first jaw clutch element, a third friction clutch drivingly associated with said gear on its side opposite said first friction clutch element and adapted to engage said second torque transmitting member, and connection means extending between said first friction clutch element and said third friction clutch element through said gear for moving said clutch elements axially and driving the same.

5. Synchronizer means for a power transmission comprising a first torque transmitting member, a second torque transmitting member, an intermediate speed gear telescopically positioned on said second member, a first jaw clutch means formed on one side of said gear, a second jaw clutch means telescopically positioned on said second member and drivingly associated therewith and adapted to be moved axially into positive engagement with said first jaw clutch, a first friction clutch element drivingly associated with said second jaw clutch means and adapted to frictionally engage said gear when said second jaw clutch is moved to engage said first jaw clutch, a second friction clutch element positioned on the side of the gear opposite said first jaw clutch and adapted to be moved axially for engagement with the second torque transmitting member, a series of apertures extending axially through said gear, and means extending through said apertures forming connections between said first and second friction clutch elements for driving and axially moving said elements.

6. Synchronizer means for a power transmission comprising a first torque transmitting member, a second torque transmitting member, a gear telescopically positioned around said second member, a jaw clutch element formed on one side of said gear, a second jaw clutch element adapted to engage said first jaw clutch and telescopically positioned around said second member and drivingly associated therewith and axially movable thereon, a first friction clutch means drivingly associated with said second jaw clutch and adapted to engage said gear when said second jaw clutch is moved axially to engage said first jaw clutch, a second friction clutch means secured on said second torque transmitting member, and a third friction clutch means independently movable and drivingly associated with said gear on its side opposite said first jaw clutch and adapted to engage said second friction clutch means as the second jaw clutch is moved axially to engage said first jaw clutch.

7. Synchronizer means for a power transmission comprising a pair of torque transmitting members to be synchronized, a first jaw clutch element drivingly associated with one of said members and axially movable thereon, a second jaw clutch element drivingly associated with the other of said members, a first friction clutch element positioned between said jaw clutch elements and adapted to engage the same when said first element is moved axially toward said second element, a second friction clutch element adapted to engage and positioned between said second jaw clutch element and said torque transmitting member which is associated with said first jaw clutch member, and a plurality of semi-rigid connecting means between the first friction clutch element and the second friction clutch element.

JOHNSTON STUART VOIGT.

REFERENCES CITED

The following references are of record in the file of this patent:

UNITED STATES PATENTS

| Number | Name | Date |
|---|---|---|
| 1,786,980 | Carling | Dec. 30, 1930 |
| 1,810,494 | Murray | June 16, 1931 |
| 1,971,045 | Maier | Aug. 21, 1934 |
| 1,982,769 | Thompson | Dec. 4, 1934 |
| 2,043,806 | Murray | June 9, 1936 |
| 2,048,883 | Murray | July 28, 1936 |

FOREIGN PATENTS

| Number | Country | Date |
|---|---|---|
| 380,758 | Great Britain | Sept. 22, 1932 |
| 538,216 | Great Britain | July 24, 1941 |